United States Patent
Nagasawa et al.

(10) Patent No.: US 10,118,586 B2
(45) Date of Patent: Nov. 6, 2018

(54) CYCLIST PROTECTION APPARATUS FOR VEHICLE AND VEHICLE

(71) Applicant: Fuji Jukogyo Kabushiki Kaisha, Tokyo (JP)

(72) Inventors: Isamu Nagasawa, Tokyo (JP); Takao Kondo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/435,187

(22) Filed: Feb. 16, 2017

(65) Prior Publication Data
US 2017/0282846 A1    Oct. 5, 2017

(30) Foreign Application Priority Data
Mar. 31, 2016 (JP) ................. 2016-071692

(51) Int. Cl.
| | | |
|---|---|---|
| *B60R 21/36* | (2011.01) | |
| *B60R 11/04* | (2006.01) | |
| *B60R 21/0134* | (2006.01) | |
| *B60R 21/00* | (2006.01) | |
| *B60R 11/00* | (2006.01) | |
| *B60R 21/01* | (2006.01) | |

(52) U.S. Cl.
CPC .............. *B60R 21/36* (2013.01); *B60R 11/04* (2013.01); *B60R 21/0134* (2013.01); *B60R 2011/0003* (2013.01); *B60R 2021/0004* (2013.01); *B60R 2021/0048* (2013.01); *B60R 2021/0055* (2013.01); *B60R 2021/0058* (2013.01); *B60R 2021/01013* (2013.01); *B60R 2300/301* (2013.01); *B60R 2300/8033* (2013.01)

(58) Field of Classification Search
CPC ...... B60R 21/36; B60R 21/0134; B60R 11/04; B60R 2011/0003; B60R 2021/0055; B60R 2300/8033; B60R 2021/0048; B60R 2021/0004; B60R 2021/01013; B60R 2300/301; B60R 2021/0058
See application file for complete search history.

(56) References Cited

U.S. PATENT DOCUMENTS

| | | | |
|---|---|---|---|
| 9,016,425 B1 * | 4/2015 | Choi ................ | B60R 21/36 180/274 |
| 2005/0206139 A1 * | 9/2005 | Mori ................ | B60R 21/36 280/730.1 |
| 2005/0230940 A1 * | 10/2005 | Alexander .......... | B60R 21/2338 280/730.1 |

FOREIGN PATENT DOCUMENTS

| | | | | |
|---|---|---|---|---|
| DE | 10059203 A1 | 7/2002 | | |
| DE | 10213178 A1 * | 2/2003 | ............ | B60R 21/36 |
| DE | 10239352 A1 * | 3/2004 | ............ | B60R 21/36 |

(Continued)

OTHER PUBLICATIONS

Japanese Office Action dated Jul. 25, 2017 issued in Japanese Application No. 2016-071692 with an English translation thereof.

*Primary Examiner* — Darlene P Condra
(74) *Attorney, Agent, or Firm* — McGinn I. P. Law Group, PLLC (57) ABSTRACT

Provided is a cyclist protection apparatus for a vehicle that includes a front section that protrudes forward from a boarding section. The cyclist protection apparatus includes a cyclist airbag device that includes airbags, and is configured to be disposed in a front-end area of the front section. The cyclist airbag device is configured to deploy the airbags adjacently in a front-rear direction on an upper surface of the front section.

19 Claims, 6 Drawing Sheets

(56) References Cited

FOREIGN PATENT DOCUMENTS

| JP | 07232615 A | * | 9/1995 | ............. B60R 21/36 |
|---|---|---|---|---|
| JP | H09-30368 A | | 2/1997 | |
| JP | 2010-012966 A | | 1/2010 | |

* cited by examiner

CYCLIST PROTECTION APPARATUS FOR VEHICLE AND VEHICLE

CROSS-REFERENCE TO RELATED APPLICATIONS

The present application claims priority from Japanese Patent Application No. 2016-071692 filed on Mar. 31, 2016, the entire contents of which are hereby incorporated by reference.

BACKGROUND

1. Technical Field

The present invention relates to cyclist protection apparatuses for vehicles and vehicles.

2. Related Art

Vehicles, such as automobiles, have the possibility of colliding with pedestrians moving outside the vehicles.

In Japanese Unexamined Patent Application Publication (JP-A) Nos. 2010-012966 and 09-030368, a plurality of airbags are deployed in a flatly-arranged manner on the hood.

Thus, the airbags are deployed flat between the upper body of a pedestrian colliding with the front of the vehicle and the hood, thereby attenuating the impact.

Moreover, vehicles, such as automobiles, also have the possibility of colliding with, for example, cyclists riding on bicycles, in addition to pedestrians.

If a cyclist and an automobile collide with each other, there is a possibility that the protection apparatus according to JP-A Nos. 2010-012966 and 09-030368 cannot properly protect the cyclist due to the position of the cyclist's waist being high.

After the collision, the cyclist may fall up onto the hood of the automobile, have his/her waist caught on the hood, and then bounce up from the dented hood. In this type of collision, there is a possibility that the protection apparatus according to JP-A Nos. 2010-012966 and 09-030368 cannot sufficiently exhibit its function.

SUMMARY OF THE INVENTION

Accordingly, in a vehicle, it is desirable to enhance the performance for protecting a colliding cyclist.

An aspect of the present invention provides a cyclist protection apparatus for a vehicle that includes a front section that protrudes forward from a boarding section. The apparatus includes The cyclist airbag device includes airbags and is configured to be disposed in a front-end area of the front section. The cyclist airbag device is configured to deploy the airbags adjacently in a front-rear direction on an upper surface of the front section.

The airbags may include a front airbag and a rear airbag. The front airbag may be configured to lie over the rear airbag in a case where a load of a cyclist is applied from a front side.

The rear airbag may be deployable higher than the front airbag.

The airbags may include three or more airbags.

The cyclist protection apparatus may further include a nose. The upper surface of the front section may include a hood constituting the upper surface of the front section. The nose cone may be configured to be disposed in front of the hood.

Another aspect of the present invention provides a vehicle. The vehicle includes a front section and a cyclist airbag device. The front section protrudes forward from a boarding section. The cyclist airbag device includes airbags and is configured to be disposed in a front-end area of the front section. The cyclist airbag device is configured to deploy the airbags adjacently in a front-rear direction on an upper surface of the front section.

DETAILED DESCRIPTION

An implementation of the present invention will be described below with reference to the appended drawings.

Figure 1:
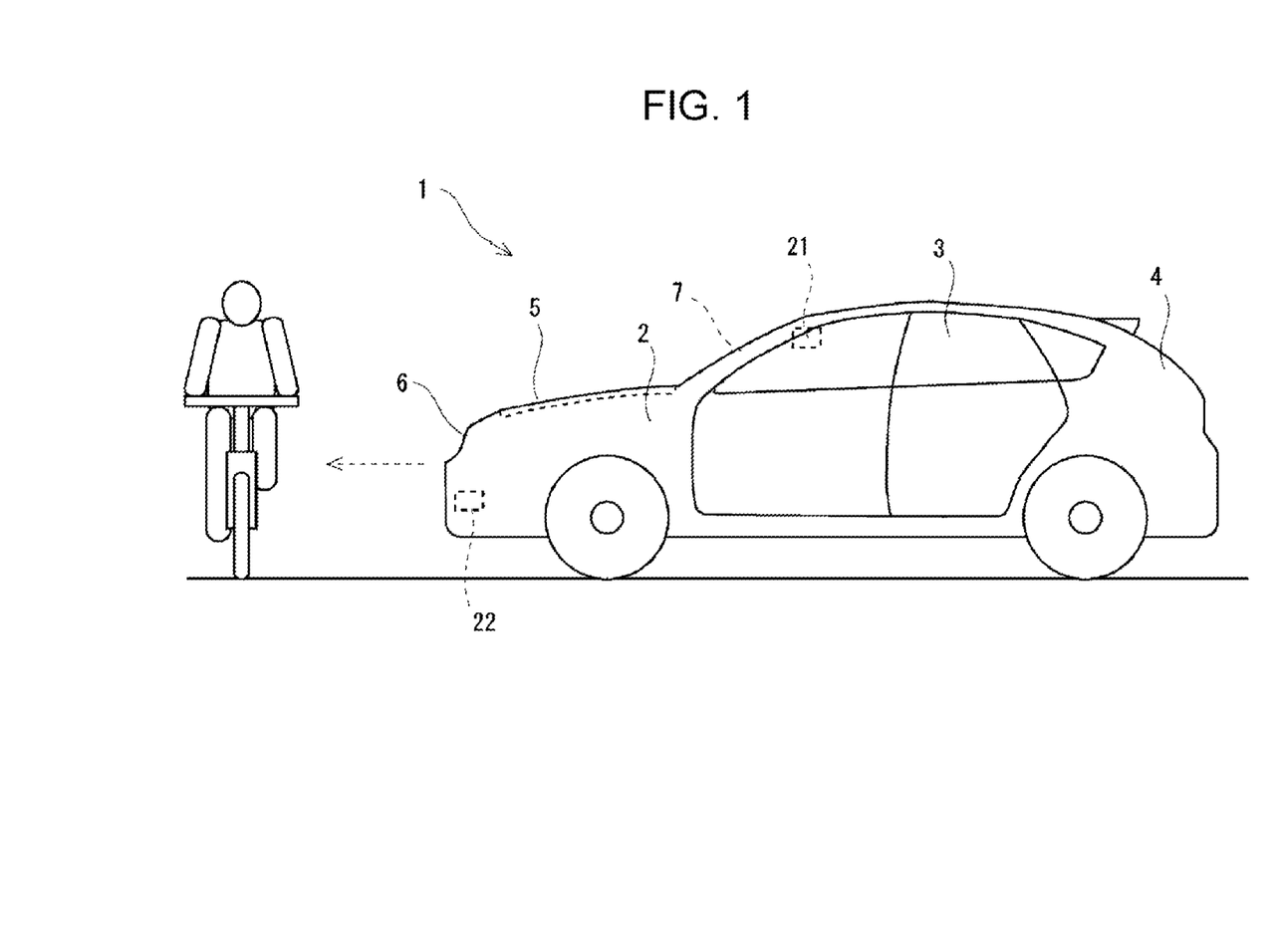
FIG. 1 is a perspective side view of an automobile according to an implementation of the present invention.

FIG. 1 is a perspective side view of an automobile 1 according to an implementation of the present invention. In FIG. 1, a side surface of the automobile 1 is illustrated together with a cyclist cycling across in front of the automobile 1.

The automobile 1 is an example of a vehicle.

A vehicle body of the automobile 1 in FIG. 1 has a front section 2, a boarding section 3, and a rear section 4.

The front section 2 protrudes forward from the boarding section 3. Power units, such as an engine and an electric motor, are disposed in the front section 2. The upper surface of the front section 2 is provided with an openable-closable hood 5. A nose cone 6 including a bumper is provided in front of the hood 5. The upper surface of the front section 2 is constituted of the hood 5 and the upper surface of the nose cone 6.

Seats on which on-board occupants sit are provided in the boarding section 3. The front surface of the boarding section 3 is provided with a front windshield 7 at a position above the upper surface of the front section 2.

The rear section 4 protrudes rearward from the boarding section 3. A luggage space is provided in the rear section 4.

FIGS. 2A to 2D illustrate an example of a vehicle-to-cyclist collision mode.

Figure 2A:
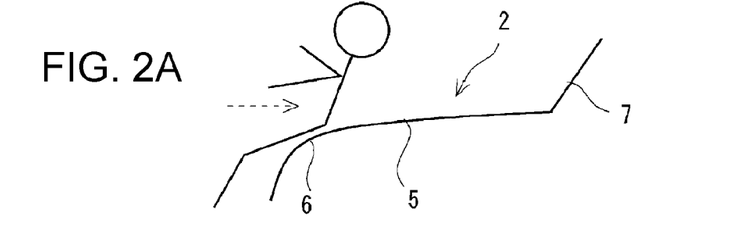
FIGS. 2A to 2D illustrate an example of a vehicle-to-cyclist collision mode.

When a cyclist collides with the front of the automobile 1, the cyclist falls up onto the hood 5 of the automobile 1 after the collision, as illustrated in FIG. 2A, due to the position of the cyclist's waist being high.

Figure 2B:
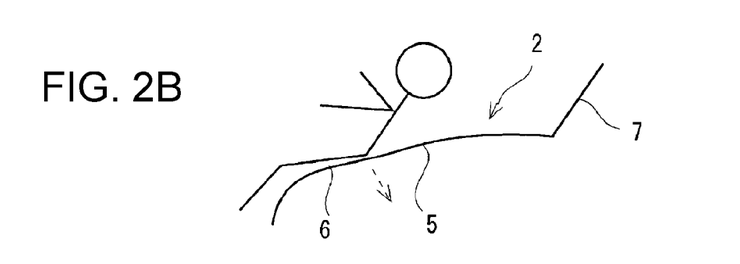
Figure 2C:
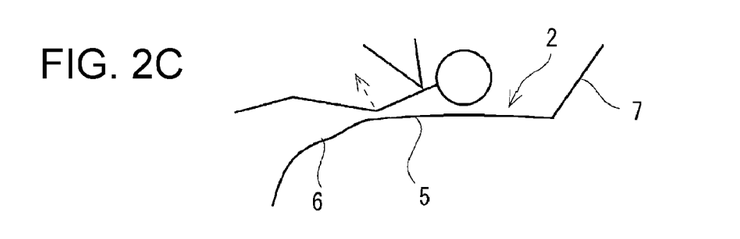

Then, the hood 5 is dented and deformed due to the load from the fallen cyclist, as illustrated in FIG. 2B. Subsequently, the hood 5 pushes the cyclist upward, as illustrated in FIG. 2C.

Figure 2D:
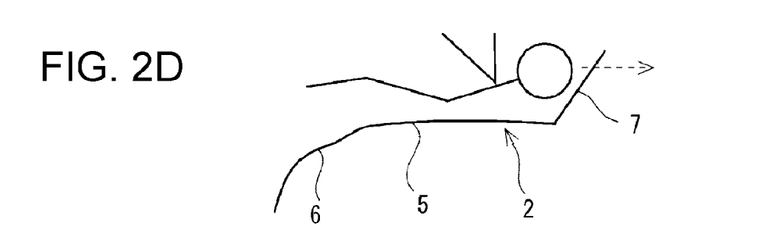

For example, the cyclist pushed upward by the hood 5 in this manner moves rearward, as illustrated in FIG. 2D, in accordance with the relative speed and the relative moving direction of the automobile 1 and the cyclist. In this case, the cyclist's head may possibly hit against the front windshield 7.

Figure 3:
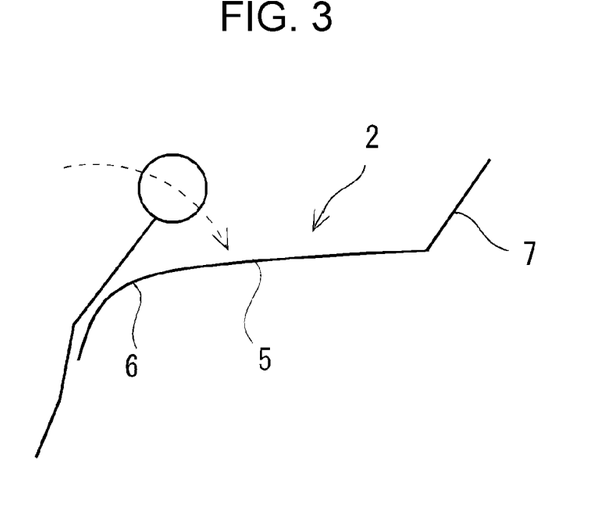
FIG. 3 illustrates an example of a vehicle-to-pedestrian collision mode.

FIG. 3 illustrates an example of a vehicle-to-pedestrian collision mode.

As illustrated in FIG. 3, when a pedestrian collides with the front of the automobile 1, the upper body of the pedestrian rotates down about the position of the waist toward the hood 5 of the automobile 1. Thus, the pedestrian is unlikely to fall up onto the hood 5 after the collision. Moreover, the pedestrian is unlikely to move rearward on the hood 5.

Accordingly, the vehicle-to-pedestrian collision mode and the vehicle-to-cyclist collision mode are different from each other. Therefore, even if an airbag is deployed flat on the hood 5 for protecting a pedestrian, it is difficult to properly protect a cyclist.

In this implementation, the performance for protecting a colliding cyclist is enhanced.

Figure 4A:
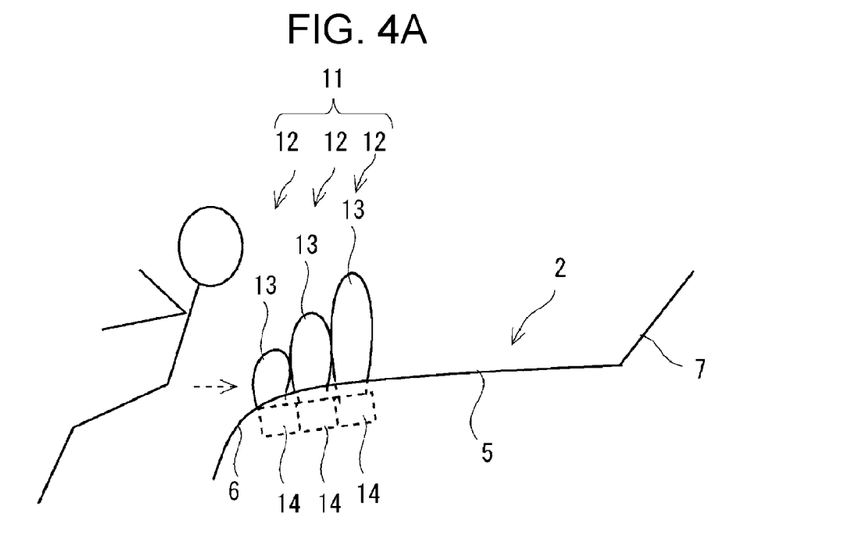
FIGS. 4A and 4B illustrate a cyclist protection apparatus according to this implementation.
Figure 4B:
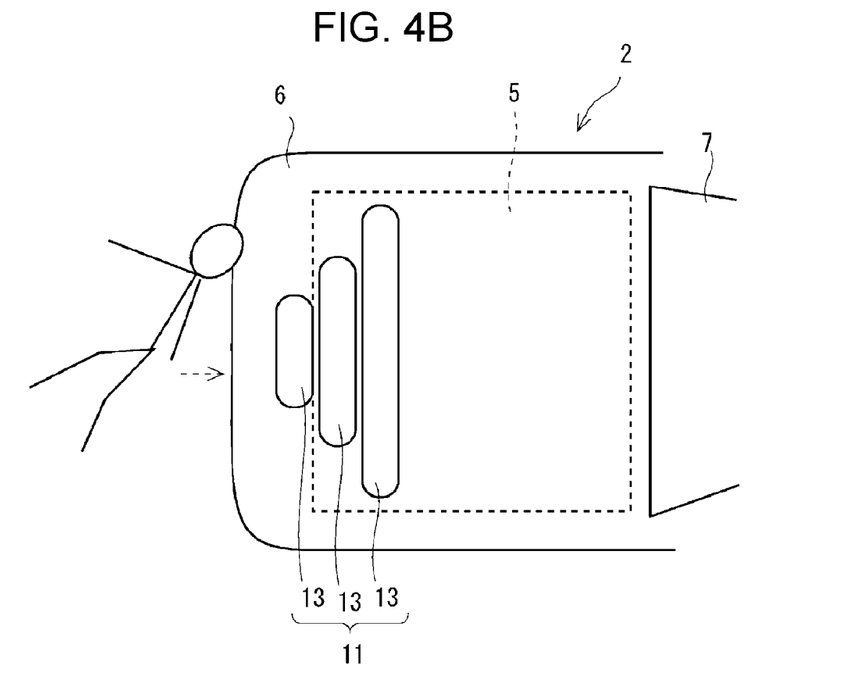

FIGS. 4A and 4B illustrate a cyclist protection apparatus 11 according to this implementation. FIG. 4A is a partial side view of the front section 2 of the vehicle body, and FIG. 4B is a top view of the front section 2 of the vehicle body.

The cyclist protection apparatus 11 in FIGS. 4A and 4B has a plurality of cyclist airbag devices 12. In FIGS. 4A and 4B, three cyclist airbag devices 12 are illustrated. The number of cyclist airbag devices 12 arranged in the front-rear direction may be two or four or more.

Each cyclist airbag device 12 has a cyclist airbag 13 and a main body 14 that accommodates the cyclist airbag 13 and an inflator.

The plurality of cyclist airbag devices 12 are arranged in the front-rear direction in the central area at the front end of the front section 2 of the automobile 1.

Each cyclist airbag 13 bursts through the hood 5 constituting the upper surface of the front section 2 and the upper surface of the nose cone 6 so as to deploy upward therefrom.

Then, the plurality of cyclist airbags 13 deploy adjacently in the front-rear direction.

Furthermore, with regard to the plurality of cyclist airbags 13, the middle cyclist airbag 13 deploys higher than the front cyclist airbag 13, and the rear cyclist airbag 13 deploys even higher than the middle cyclist airbag 13. The rear cyclist airbag 13 deploys higher than the adjacent cyclist airbags 13 in front thereof.

Moreover, with regard to the plurality of cyclist airbags 13, the middle cyclist airbag 13 deploys wider in the vehicle width direction than the front cyclist airbag 13, and the rear cyclist airbag 13 deploys even wider in the vehicle width direction than the middle cyclist airbag 13. The rear cyclist airbag 13 deploys wider in the vehicle width direction than the adjacent cyclist airbags 13 in front thereof.

Figure 5:
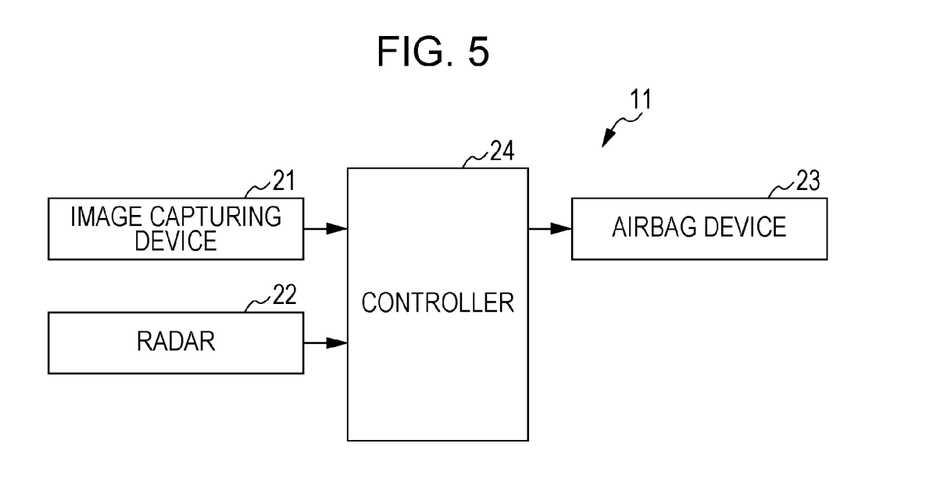
FIG. 5 is a block diagram of a control system of the cyclist protection apparatus in FIGS. 4A and 4B.

FIG. 5 is a block diagram of a control system of the cyclist protection apparatus 11 in FIGS. 4A and 4B.

In the control system in FIG. 5, an image capturing device 21, a radar 22, an airbag device 23, and a controller 24 coupled to these devices are illustrated. The airbag device 23 includes the plurality of cyclist airbag devices 12.

The controller 24 predicts a collision based on detections by the image capturing device 21 and the radar 22 and detects a collision. Then, the controller 24 outputs an inflator ignition signal to the airbag device 23 at a necessary timing.

For example, if a collision with a cyclist is detected, an ignition signal is output to the plurality of cyclist airbag devices 12, so that the plurality of cyclist airbags 13 are deployed.

The image capturing device 21 is, for example, a pair of image capturing elements provided facing forward at either one of the roof of the boarding section 3 and the front windshield 7, as illustrated in FIG. 1, and observes the peripheral conditions ahead of the automobile 1 by imaging.

The radar 22 is disposed at, for example, the front surface of the front section 2 of the automobile 1. The radar 22 emits an ultrasonic wave or a radio wave and observes the peripheral conditions ahead of the automobile 1 in accordance with, for example, whether or not there is a reflected wave.

Then, the controller 24 specifies an obstacle, such as a cyclist passing in front of the automobile 1, so as to determine whether there is a possibility of a collision with the obstacle.

Figure 6:
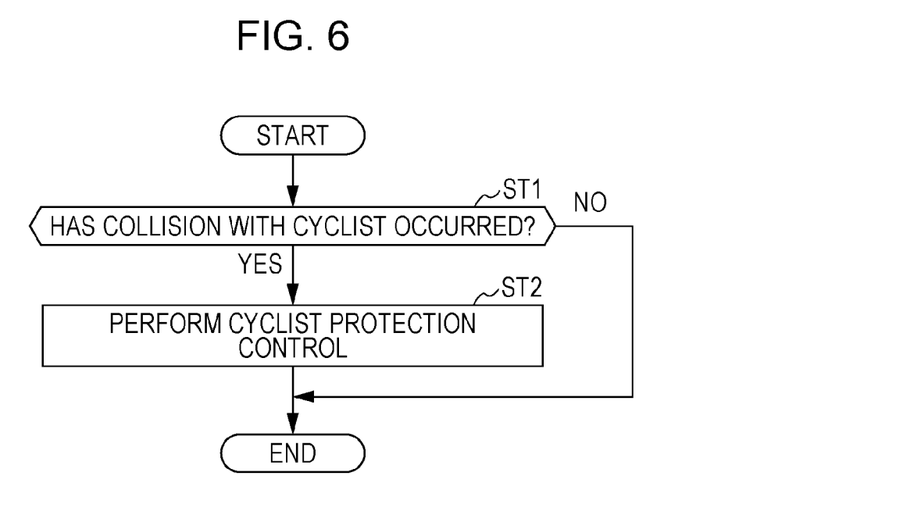
FIG. 6 is a flowchart of control executed by a controller in FIG. 5 when a collision with a cyclist occurs.

FIG. 6 is a flowchart of control executed by the controller 24 in FIG. 5 when a collision with a cyclist occurs.

The controller 24 periodically executes the cyclist collision control in FIG. 6.

As illustrated in FIG. 6, the controller 24 determines whether or not a collision with a cyclist has occurred (step ST1). For example, if a collision with a cyclist is detected, it may be determined that the collision with the cyclist has occurred.

If the collision with the cyclist has occurred, the controller 24 executes control for protecting the cyclist (step ST2). Specifically, an ignition signal is output to the plurality of cyclist airbag devices 12. Thus, as illustrated in FIGS. 4A and 4B, the plurality of cyclist airbags 13 are deployed. In this case, the order in which the plurality of cyclist airbags 13 are deployed may be controlled. For example, the plurality of cyclist airbags 13 may be deployed sequentially from the front.

Figure 7A:
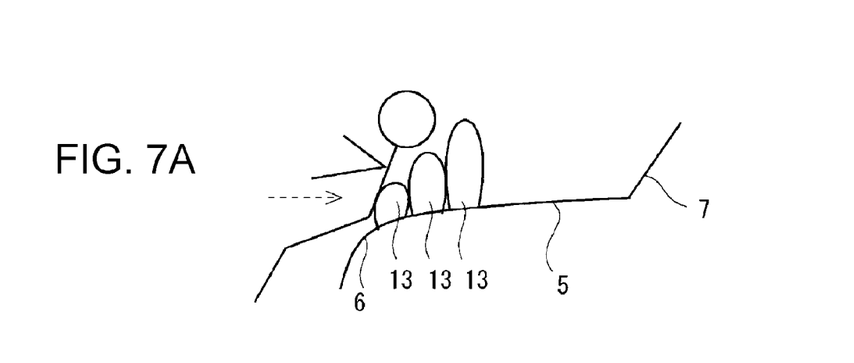
FIGS. 7A to 7C illustrate an example of a vehicle-to-cyclist collision mode according to this implementation.
Figure 7B:
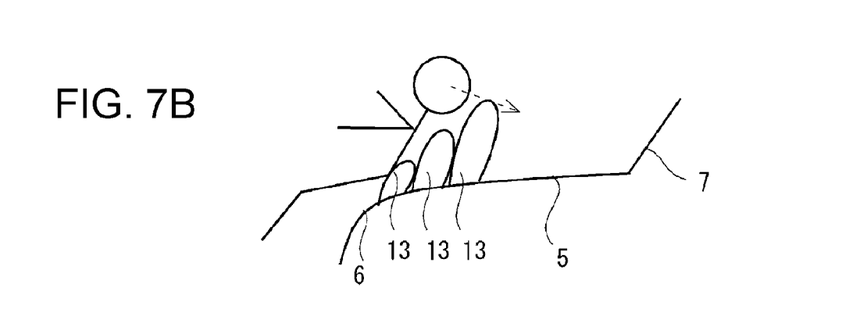
Figure 7C:
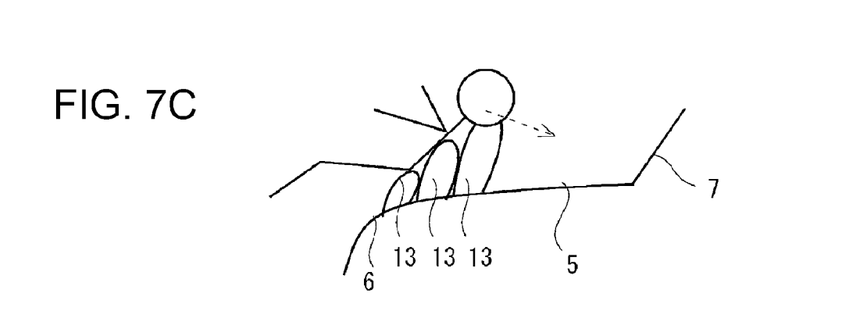

FIGS. 7A to 7C illustrate an example of a vehicle-to-cyclist collision mode according to this implementation.

By executing the control in FIG. 6, the plurality of cyclist airbags 13 are deployed adjacently in the front-rear direction on the upper surface of the front section 2 of the automobile 1.

Then, the colliding cyclist tends to fall up onto the hood 5 of the automobile 1, as illustrated in FIG. 7A, due to the position of the cyclist's waist being high.

In this implementation, since the plurality of cyclist airbags 13 are deployed adjacently and densely in the front-rear direction, the cyclist's waist comes into contact with the front-most cyclist airbag 13, so that the load of the cyclist's waist is applied thereto. The front-most cyclist airbag 13 is supported by the remaining cyclist airbags 13 deployed behind the front-most cyclist airbag 13, so that the front-most cyclist airbag 13 is maintained in an erected state even in the state where the load is applied thereto, thereby absorbing the load.

With regard to the cyclist with his/her waist in contact with the front-most cyclist airbag 13, the upper body of the cyclist moves rearward due to inertia, so that the cyclist rotates downward toward the hood 5, as illustrated in FIG. 7B.

Then, the upper body of the cyclist falling toward the hood 5 falls up onto the plurality of cyclist airbags 13, as illustrated in FIG. 7C.

Accordingly, in this implementation, the cyclist airbag devices 12 are provided at the front end of the front section 2 of the automobile 1, and the plurality of cyclist airbags 13 are deployed adjacently on the upper surface of the front section 2 from the cyclist airbag devices 12. Thus, even if the cyclist falls up onto the front section 2 of the automobile 1 after the collision, the plurality of cyclist airbags 13 can receive the body of the fallen cyclist. The fallen cyclist is unlikely to move rearward thereafter.

Furthermore, in this implementation, in a case where the load of the cyclist is applied from the front to the plurality of cyclist airbags 13 deployed adjacently in the front-rear direction, the cyclist airbag 13 located at the front side lies over the cyclist airbag 13 located therebehind. Therefore, the cyclist airbag 13 located at the front side lying over the cyclist airbag 13 located therebehind is unlikely to fall rearward even if the load is applied from the front. The cyclist airbag 13 at the front side, which is unlikely to fall rearward, can properly receive the load of the cyclist applied from the front.

Furthermore, in this implementation, with regard to the plurality of cyclist airbags 13 deployed adjacently in the front-rear direction, the cyclist airbag 13 located at the rear side deploys higher than the cyclist airbag 13 located in front thereof. The upper edges of the plurality of cyclist airbags 13 form a linear imaginary plane. Thus, in a case where the upper body of the cyclist in contact with the front-most cyclist airbag 13 from the front and received by the front-most cyclist airbag 13 rotates downward toward the upper surface of the front section 2, the entire upper body can be supported by the imaginary plane extending along the upper body.

In contrast, in a case where only a part of the upper body comes into contact with the cyclist airbags 13, the contact area thereof tends to receive the falling load in a concentrated manner.

In this implementation, the number of cyclist airbags 13 to be deployed adjacently in the front-rear direction is three. Accordingly, three or more cyclist airbags 13 are adjacent to one another in the front-rear direction so that the front-most cyclist airbag 13 can stand upright from the upper surface of the front section 2 even when a load is applied from the front, thereby readily maintaining its deployed orientation.

Although the implementation described above is an example of a preferred implementation of the present invention, the present invention is not limited to the above implementation and permits various modifications and alterations so long as they do not depart from the scope of the invention.

For example, in the above-described implementation, the plurality of cyclist airbag devices 12 are arranged in the front-rear direction from the upper surface of the nose cone 6 to the hood 5.

Alternatively, for example, the plurality of cyclist airbag devices 12 may be arranged in the front-rear direction in the hood 5.

The invention claimed is:

1. A cyclist protection apparatus for a vehicle comprising a front section that protrudes forward from a boarding section, the cyclist protection apparatus comprising:
    a cyclist airbag device comprising airbags, the cyclist airbag device being configured to be disposed in a front-end area of the front section,
    wherein the cyclist airbag device is configured to deploy the airbags adjacently in a front-rear direction on an upper surface of the front section,
    wherein a volume of the deployed airbags sequentially increases from the front section toward a rear section of the vehicle, in the front-rear direction, as the airbags extend from the front section toward a windshield of the vehicle, and
    wherein a width of the deployed airbags increases in the front-rear direction as the airbags extend toward the windshield of the vehicle.

2. The cyclist protection apparatus for a vehicle according to claim 1, wherein the airbags deployed adjacently in the front-rear direction comprises a front airbag and a rear airbag, and
    wherein the front airbag is configured to lie over the rear airbag in a case where a load of a cyclist is applied from a front side.

3. The cyclist protection apparatus for a vehicle according to claim 2, wherein, with respect to the upper surface of the front section, the rear airbag is deployable with a higher height than the front airbag.

4. The cyclist protection apparatus for a vehicle according to claim 3, wherein the airbags comprises three or more airbags.

5. The cyclist protection apparatus for a vehicle according to claim 4, further comprising a nose cone,
    wherein the upper surface of the front section comprises a hood constituting the upper surface of the front section, and
    wherein the nose cone is configured to be disposed in front of the hood.

6. The cyclist protection apparatus for a vehicle according to claim 3, further comprising a nose cone,
    wherein the upper surface of the front section comprises a hood constituting the upper surface of the front section, and
    wherein the nose cone is configured to be disposed in front of the hood.

7. The cyclist protection apparatus for a vehicle according to claim 2, wherein the airbags comprises three or more airbags.

8. The cyclist protection apparatus for a vehicle according to claim 7, further comprising a nose cone,
    wherein the upper surface of the front section comprises a hood constituting the upper surface of the front section, and
    wherein the nose cone is configured to be disposed in front of the hood.

9. The cyclist protection apparatus for a vehicle according to claim 2, further comprising a nose cone,
    wherein the upper surface of the front section comprises a hood constituting the upper surface of the front section, and
    wherein the nose cone is configured to be disposed in front of the hood.

10. The cyclist protection apparatus for a vehicle according to claim 1, wherein the airbags comprises a front airbag and a rear airbag, and
    wherein, with respect to the upper surface of the front section, the rear airbag is deployable with a higher height than the front airbag.

11. The cyclist protection apparatus for a vehicle according to claim 10, wherein the airbags comprises three or more airbags.

12. The cyclist protection apparatus for a vehicle according to claim 11, further comprising a nose cone,
    wherein the upper surface of the front section comprises a hood constituting the upper surface of the front section, and
    wherein the nose cone is configured to be disposed in front of the hood.

13. The cyclist protection apparatus for a vehicle according to claim 10, further comprising a nose cone,
    wherein the upper surface of the front section comprises a hood constituting the upper surface of the front section, and
    wherein the nose cone is configured to be disposed in front of the hood.

14. The cyclist protection apparatus for a vehicle according to claim 1, wherein the airbags comprises three or more airbags.

15. The cyclist protection apparatus for a vehicle according to claim 14, further comprising a nose cone,
wherein the upper surface of the front section comprises a hood constituting the upper surface of the front section, and
wherein the nose cone is configured to be disposed in front of the hood.

16. The cyclist protection apparatus for a vehicle according to claim 1, further comprising a nose cone,
wherein the upper surface of the front section comprises a hood constituting the upper surface of the front section, and
wherein the nose cone is configured to be disposed in front of the hood.

17. A vehicle, comprising:
a front section that protrudes forward from a boarding section; and
a cyclist airbag device comprising airbags, the cyclist airbag device being configured to be disposed in a front-end area of the front section,
wherein the cyclist airbag device is configured to deploy the airbags adjacently in a front-rear direction on an upper surface of the front section,
wherein a volume of the deployed airbags sequentially increases from the front section toward a rear section of the vehicle, in the front-rear direction, as the airbags extend from the front section toward a windshield of the vehicle, and
wherein a width of the deployed airbags increases in the front-rear direction as the airbags extend toward the windshield of the vehicle.

18. The vehicle according to claim 17, further comprising a nose cone,
wherein the upper surface of the front section comprises a hood constituting the upper surface of the front section, and
wherein the nose cone is configured to be disposed in front of the hood.

19. A cyclist protection apparatus for a vehicle comprising a front section that protrudes forward from a boarding section, the cyclist protection apparatus comprising:
a cyclist airbag device comprising airbags, the cyclist airbag device being configured to be disposed in a front-end area of the front section,
wherein the cyclist airbag device is configured to deploy the airbags adjacently in a front-rear direction on an upper surface of the front section,
wherein a volume of the deployed airbags sequentially increases from the front section toward a rear section of the vehicle, in the front-rear direction, as the airbags extend from the front section toward a windshield of the vehicle, and
wherein, in a plan view, an entirety of the airbags is located between a front edge of the vehicle and a center of the front section located between the windshield and the front edge of the vehicle.

* * * * *